UNITED STATES PATENT OFFICE.

WALTER EDWIN WINDSOR RICHARDS, OF HIGH HOLBORN, LONDON, ENGLAND.

MANUFACTURE OF ELECTRIC INSULATING MATERIALS AND THE LIKE.

1,267,696.     Specification of Letters Patent.     Patented May 28, 1918.

No Drawing.     Application filed December 22, 1915. Serial No. 68,224.

*To all whom it may concern:*

Be it known that I, WALTER EDWIN WINDSOR RICHARDS, residing at 133/6 High Holborn, London, W. C., England, have invented certain new and useful Improvements in the Manufacture of Electric Insulating Materials and the like; and I do hereby declare the following to be a full, clear, and exact description of the invention, such as will enable others skilled in the art to which it appertains to make and use the same.

This invention relates to the manufacture of electric insulating materials which materials are also suitable for other purposes to be described. Difficulties have hitherto been met with in the use of cement for the manufacture of electric insulating materials owing to the fact that the water used for causing the cement to set destroys the insulating properties which the article would otherwise have, and the principal object of this invention is to overcome these difficulties.

The invention further consists in the impregnation by suitable processes of molded articles made up from cement either with or without the addition of asbestos or the like with the material to be described, this impregnation having the effect of rendering the articles suitable for use as insulators or for other like purposes. The invention is carried out as follows:—

The articles to be used as insulators are made up of cement which may be either of the Portland, Roman or natural type, either with or without the addition of asbestos, and they are molded or formed by any convenient and known method into suitable shapes, such as plates, slabs or the like. After the cement is hardened or set it is treated with the water-proofing material, which consists of the soluble pitch like residuum referred to in my prior specification No. 746682 (serial number).

The pitch-like residuum just referred to is that obtained by distillation from the lighter fraction of tar (such as ordinary gas tar) after the same has been acidulated and treated as described in lines 7 to 23 inclusive of the provisional specification of my English Patent No. 3,008 of 1912. Moreover, as mentioned on page 4, lines 36 to 39 inclusive of my said English patent, the distillation of the lighter oils separated from the coal tar after acidulation may be carried out at a temperature above or below 400 C. according to the use to which the residuum is intended to be put, but I find that for purposes of impregnating material intended for use in insulating purposes it is preferable to carry out the distillation in the neighborhood of 300 C.

The impregnating operation is preferably carried out in closed pans having perforated supports for supporting the articles to be impregnated, the pans being arranged so that every two of them are inter-communicating and operating on the alternate pressure system.

It has further been found that satisfactory results can be obtained by merely placing the articles to be impregnated in the melted residuum under atmospheric pressure and leaving them there for a sufficiently long time. The process carried on in this way will take considerably longer than where the pans referred to are used, and it will therefore be preferable wherever possible to use the latter method.

Where ordinary methods of impregnating are applied it will generally be found necessary to subject the molded articles prior to their impregnation to a drying process for the purpose of removing any traces of uncombined water left from the water required to cause the cement to set, but where the apparatus described and illustrated is used it has been found that satisfactory results are obtained without the necessity of subjecting the articles to this preliminary drying. Alternative methods for carrying out the impregnation may consist of the following, although as stated it will be preferable wherever possible to use the improved apparatus previously described.

(1) The article, or articles, may be immersed in a bath of heated residuum, and heat applied for some time: The uncombined water in the cement will be expelled as steam while the article will absorb residuum into its interstices or pores in place of the expelled steam.

(2) The article *e. g.* slab may be heated to a temperature approximately 200 degrees cent. prior to its immersion in the bath of residuum the object being to drive off the uncombined water, and the heating must be continued for a sufficient length of time to effect this end, after which the slab is immersed in the bath of warm residuum and absorption of the latter again takes place, (3) The slab, which may or may not have been previously heated, is placed in a suitable covered pan or vessel containing melted residuum, and if the impregnating material is such that unless heated it solidifies, heat must be employed. Atmospheric air is then forced into the vessel until a considerable pressure is indicated, whereby the residuum is forced into the pores of the slab or article.

Insulating materials according to this invention have been found to yield highly satisfactory results, and where the article has been impregnated with the soluble residuum previously referred to the insulator has been found capable of withstanding a pressure of 10,000 to 15,000 volts per millimeter, which result is far superior to that obtained with any other impregnating material.

It has been previously stated that the articles to be impregnated may be made up of cement either with or without the addition of asbestos, and any other convenient and suitable fibrous material may be added if desired without departing from the spirit of the invention.

Besides being suitable for use as electric insulators, articles produced according to this invention will be found to be absolutely water-proof, and will not absorb water even if immersed therein for a considerable time. Such articles might possibly be used for making tanks or containers for holding water and for a variety of other purposes. Articles produced according to this invention will not soften under the influence of heat, and they can be produced in a more convenient and economical manner than previously known insulating materials of this type. Moreover, articles produced according to this invention have a jet black color and assume a high polish without additional treatment after impregnation.

If rods or the like made up from cement and asbestos are treated according to this invention it will be found that they may be turned in a lathe to any desired shape, and that the color is continuous right through the article.

I claim:—

1. The method of manufacturing electric insulating materials which consists in impregnating articles made of cement with the soluble pitch like residuum described.

2. The method of manufacturing products having a polished solid black surface and which have also waterproof and electric insulating qualities which consist solely in impregnating articles made of cement with the soluble pitch like residuum described.

3. As an article of manufacture a porous cohesive mineral base impregnated with the soluble pitch-like residuum described.

4. As an article of manufacture a porous cohesive mineral base impregnated with a soluble pitch-like residuum consisting of products obtained by distillation from the lighter fraction of tar, after the same has been acidulated and properly treated.

In testimony whereof I affix my signature in presence of two witnesses.

WALTER EDWIN WINDSOR RICHARDS.

Witnesses:
 FRANK B. DEHN,
 ALBERT R. RAMSEY.

Copies of this patent may be obtained for five cents each, by addressing the "Commissioner of Patents, Washington, D. C."